Figure 1:
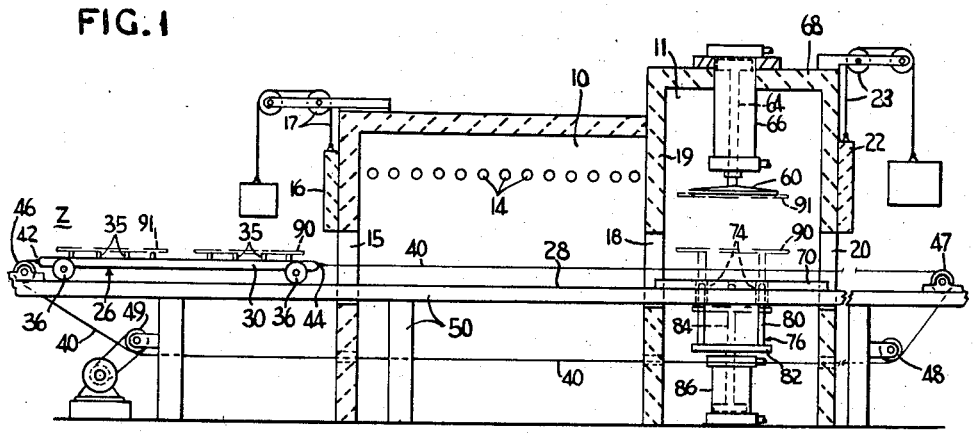

Aug. 25, 1959  W. R. CLEVER  2,900,761
METHOD OF AND APPARATUS FOR TRANSFERRING SHEET MATERIAL
Original Filed Oct. 25, 1952

INVENTOR.
WILLIAM R. CLEVER

BY

*Oscar L. Spencer*

ATTORNEY

United States Patent Office 2,900,761
Patented Aug. 25, 1959

2,900,761

METHOD OF AND APPARATUS FOR TRANSFERRING SHEET MATERIAL

William R. Clever, Lincoln, Ill., assignor to Pittsburgh Plate Glass Company, Allegheny County, Pa., a corporation of Pennsylvania Continuation of application Serial No. 316,867 dated October 25, 1952. This application July 23, 1957, Serial No. 673,661

7 Claims. (Cl. 49—1)

The present invention relates to processes of and apparatus for transferring sheets of glass, and it has particular relation to such processes and apparatus as may be employed to transfer sheets of glass which are to be welded together to form a double glazed unit.

It has heretofore been proposed to construct double glazed units which can be substituted for conventional single plates or panes of glass in windows by heating to the softening point and then bending over the edges of one pane or sheet of glass and sealing a second sheet thereto by fusing the contacting portions to provide a sealed monolithic unit. Such units are characterized by the permanent exclusion of moisture from the interior thereof. Also the air or other gas sealed therein provides an excellent nonconductive medium for heat. This constitutes the unit an excellent heat insulator.

A process for making units of this type is disclosed in my copending application, Serial No. 149,562, filed March 14, 1950, now U.S. Patent No. 2,624,579, and entitled "Welded Double Glazing Unit." The process comprises supporting two sheets of glass in superposed but slightly spaced relationship to each other, one of said sheets having a pore hole therein, heating the margins of the upper sheet until they droop and become welded with the margins of the lower sheet, pulling the upper sheet upwardly to provide a chamber between the sheets and abruptly increasing the air pressure within the unit to effect filleting of the welded connection between the sheets.

In this process the heating of the edges of the glass is effected by localized electrical heating. In order to initiate the electrical heating operation, it is desirable to apply a stripe of an electrically conductive material such as colloidal graphite on the bottom surface of the upper sheet of glass near the edges of the sheet. An electric current is then passed through the stripe to effect heating of the stripe and the glass immediately adjacent to and underneath the stripe. After the heating operation has been adequately initiated, the glass itself becomes a conductor and the electrical heating can be so continued even after the electrically conductive stripe has been burned away.

In a process for making all glass welded double glazed units such as described above, the glass sheets are washed, striped and then welded. It is extremely important that contact by handling equipment with the washed surfaces of the glass sheets that are to form the interior of the unit be kept to a minimum. Any marks or dirt which occur on these surfaces cannot be removed after the unit is welded. Thus it can be seen that the provision of a method of and an apparatus for handling the glass after it has been washed and striped without contacting these surfaces is desirable.

It is necessary to preheat the glass sheets prior to the welding operation to prevent cracking of the glass during the initial stages of the welding. Usually the top and bottom sheets after being appropriately striped are placed side by side upon graphite knobs on a suitable carriage, specifically denoted as a charging car or carriage. The carriage is moved into a preheating chamber where the glass is heated to a temperature of about 1000° F. After the glass has been preheated, it is moved into a welding chamber where the heated glass is removed from the carriage and placed in proper position for welding.

A method previously employed to remove the sheets of glass from the carriage entails engaging the top surfaces of each sheet with a vacuum head located above the carriage and lifting them off the carriage. The bottom sheet is removed first and placed on a suitable supporting means. The top sheet is then removed by the vacuum head and held in place over the bottom sheet preparatory for welding.

It can be seen that in such method of handling the washed, striped and preheated glass sheets, the top surface of the heated bottom sheet is contacted with a vacuum head. The top surface of the bottom sheet forms an inside surface of the welded unit, therefore, it is absolutely necessary that no marks or dirt occur on this surface. As stated above, the glass is heated to a temperature of about 1000° F. and contact of the glass at this temperature with a vacuum head frequently results in marks or dirt on the surface of the glass.

In accordance with the present invention a method and apparatus for transferring heated glass preparatory for welding or other operation has been provided. This method comprises mounting the glass on a charging carriage having an opening in a side thereof, moving the carriage into a welding chamber, projecting a supporting means through the opening to engage the bottom surface of the sheet of glass and removing the sheet. The opening in the side of the carriage permits the supporting means to engage the bottom surface of the glass and allows the carriage to be moved away from the supporting means after its engagement with the glass.

In a preferred embodiment of the invention, a charging carriage having openings in a side and bottom of the carriage is employed in combination with a supporting means which rises through the bottom opening to engage the bottom surface of the glass and raise the glass off of the carriage. The carriage can then be withdrawn in a sidewise direction from the supporting means with the supporting means passing through the side opening in the carriage.

For a better understanding of the invention, reference may now be had to the accompanying drawings in which like numerals refer to like parts throughout.

Figure 2:
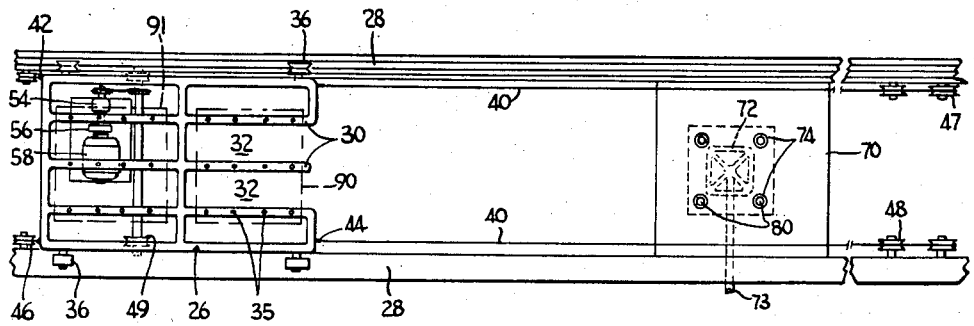

In the drawings,

Fig. 1 is a vertical section of a preheating and welding chamber having apparatus therein for transferring glass preparatory to welding thereof into double glazed units in accordance with the provisions of the present invention, and Fig. 2 is a plan view of the apparatus shown in Fig. 1 with the preheating and welding chambers being omitted.

An appropriate apparatus for use in the practice of the invention is illustrated in Fig. 1. This apparatus includes a chamber 10 for preheating and a chamber 11 for welding in side by side relationship, each constructed of an appropriate refractory material. Chamber 10 is heated by any convenient means, such as electrical heater elements 14 extending from a side wall of the chamber 10. Other means, for example gas burners, could be substituted for the electrical heating elements if so desired. Chamber 10 is provided with an outer door or inlet 15 having a closure 16 which is movable vertically by means of conventional closure operating mechanism 17. The preheating chamber 10 is designed to preheat the glass, for example, to a temperature of 800° F. to 1000° F. depending upon the critical temperature of the glass in order to prevent breakage of the glass due to thermal stresses during subsequent welding operations.

Chamber 10 communicates with welding chamber 11 through a door or opening 18 formed below a partition 19 between the two chambers. Chamber 11 is provided with an outer door or outlet 20 having a closure 22 which is movable vertically by means of conventional closure operating mechanism 23.

For purposes of carrying the sheets of glass through the chambers for successive operations, a carriage 26 is provided which runs on trackway 28. This trackway 28 extends through the various doors or openings to the chambers and preferably extends sufficiently far outside of the chamber 10 to provide a loading zone Z.

The carriage 26 includes a rectangular framework 30 having one or more openings 32 on one side of the rectangular framework. The openings 32 in the framework can be seen in Fig. 2. The openings are in the form of rectangles as shown in carriage 26, however, they may be in other shapes. The upper surface of the framework 30 is provided with a series of graphite studs or buttons 35 designed to support one or more sheets of glass in spaced relation with respect to the framework.

The carriage 26 travels upon wheels 36 riding on track 28 and may be reciprocated upon the trackway by any convenient apparatus. For example, the charging carriage 26 may be moved along trackway 28 by means of a roller chain 40 connected to the carriage at 42 and 44. The chain 40 runs around pulleys 46, 47, 48 and 49 which are rotatably connected to a framework 50 which supports the preheating chamber 10 and welding chamber 11. Pulley 49 is connected by means of transmission device 54 and electromagnetic clutch 56 to reversible motor 58 which provides a means for moving the chain 40. The glass sheets are appropriately preheated upon the car.

The means for removing the preheated glass from the charging car 26 is shown in welding chamber 11. A vacuum head 60 is connected to the lower extremity of a hollow piston rod 64 which moves vertically in a cylinder 66 mounted in the roof 68 of the chamber 11. The piston rod 64 is tubular so as to provide a vacuum connection for the vacuum head to a suitable source of vacuum (not shown). The piston rod may be reciprocated in the cylinder by means of fluid pressure or other suitable means.

On the bottom of the welding chamber 11 is platen 70 which may be formed by any refractory material such as soapstone, high silica glass or other appropriate material. This platen is provided with one or more suitable depressions or grooves 72, having connections 73 to a source of vacuum so that a sheet of glass placed upon them can be held securely in position during the various welding and forming operations.

Extending through holes 74 in the platen and bottom of the chamber 11 from beneath the chamber 11 are glass supporting means 76. These supporting means are in the form of vertical rods 80 having their uppermost tips capped with some material such as asbestos which will not mark or break the glass or deteriorate at the temperature of operation of the welding furnace. The lower end of the rods 80 are fastened to a plate 82 which is mounted on the end of a piston rod 84 in cylinder 86. The supporting means is reciprocated through the bottom of the welding furnace by means of a fluid in the cylinder or by other suitable means. The rods 80 may be hollow and connected to a source of vacuum to hold the glass in position thereon if necessary or desired.

In one mode of operation of the apparatus described above, bottom glass sheet 90 and top glass sheet 91 are carried into the welding chamber 11 after they have preheated in chamber 10 upon the carriage 26. The carriage 26 is moved into the chamber and stopped so that bottom glass sheet 90 is directly above glass supporting means 76. The piston rod 84 is actuated upwardly in cylinder 86 so as to cause supporting means 76 to rise through holes 74 in platen 70 and through openings 32 in carriage 26 to engage the bottom surface of the bottom sheet of glass 90 and raise it a few inches off the graphite supporting knobs 35.

The charging carriage 26 is retracted along tracks 28 toward the preheating chamber 10 and the bottom sheet 90 is then lowered onto platen 70 by retracting piston rod 84 in cylinder 86. The supporting means 76 is lowered sufficiently so that the uppermost tips of the rods 80 are below the top surface of the platen 70, thereby allowing the glass 90 to rest freely upon the platen.

The carriage 26 containing top sheet of glass 91 is again moved into the welding chamber and stopped in a position such that the top sheet of glass 91 is directly beneath vacuum head 60. The vacuum head 60 is lowered to engage the top surface of top sheet of glass 91, a vacuum is applied to the vacuum head and the vacuum head and glass attached thereto is raised a short distance to clear the glass 91 from the carriage. The carriage 26 is then retracted from the welding furnace and top glass sheet 91 is lowered by the vacuum head until it almost, but preferably does not quite touch the lower sheet 90. The top sheet 91 is supported in this position and the welding operation is begun. The welding operation is explained more fully in the above described copending application.

Another mode of operation of the apparatus described above involves placing top glass sheet 91 on top of and in line with bottom glass sheet 90 on a charging carriage such as carriage 26 having an opening in a side and bottom thereof. Here again the carriage is moved into the welding chamber and stopped therein so that the bottom glass sheet 90 is directly above the supporting means 76.

In this instance, the glass supporting means engages the bottom surface of the bottom sheet of glass and raises both the bottom and top sheet of glass off of the carriage, the carriage is removed and the bottom glass sheet is deposited on the platen with the top sheet being supported by the bottom sheet.

The vacuum head 60 is lowered to engage the top surface of the top sheet of glass and a vacuum is applied to the vacuum head. The vacuum head and top glass sheet 91 attached thereto are raised a short distance into proper position for welding and maintained in such position preparatory to the commencing of the welding operation.

There are several advantages to this latter mode of operation. The top and bottom sheet are aligned with respect to each other when placed on the carriage, therefore, it is not necessary to perform this alignment in the welding chamber. Also, such mode of operation requires only one movement of the carriage into and out of the welding chamber.

The size of the carriage and length of the preheating chamber need not be as great when the top sheet of glass is placed on the bottom sheet of glass on the carriage. Furthermore, placing the top sheet of glass directly on top of the bottom sheet acts to prevent the top surface of the bottom sheet and the bottom surface of the top sheet from collecting any dust or foreign matter thereon during the transfer of the sheets into position preparatory for welding.

It can be seen from the description of the apparatus and mode of operation thereof that the surfaces of the glass sheets which are to form the interior of the welded double glazed unit, i.e., the bottom surface of top sheet 91 and the top surface of bottom sheet 90, are not brought into contact with any handling equipment during their transfer from the carriage 26 to a position preparatory for welding of the sheets. The particular design of the carriage 26 having a side opening therein and the supporting means 74 in combination therewith enables the bottom sheet to be removed without contacting the top surface thereof. This, coupled with the movement of the top sheet 91 by the vacuum head 60, provides the desired result.

This application is a continuation-in-part of my copending application, Serial No. 149,562, filed March 14, 1950, now U.S. Patent No. 2,624,579 entitled "Method of Producing A Welded Double Glazing Unit," and my abandoned application, Serial No. 67,696, filed December 28, 1948, entitled "Welded Double Glazing Unit," and a continuation of my copending application, Serial No. 316,867, filed October 25, 1952, now abandonded, and entitled "Method of and Apparatus for Transferring Sheet Material."

Although the present invention has been described with reference to specific details of certain embodiments thereof, it is not intended that such details shall be regarded as limitations upon the scope of the invention except insofar as included in the accompanying claims.

I claim:

1. An apparatus for making double glazed units comprising a welding chamber, means mounted in the welding chamber for supporting one glass sheet in superposed, spaced relation to another glass sheet, a carriage movable in and out of the welding chamber, said carriage having an opening in a side thereof, and glass engaging supports movable through the opening in the carriage into contact with the bottom surface of a sheet of glass mounted on the carriage so as to raise the glass sheet from the carriage when it is in the chamber and being free from engagement from the carriage as it moves out of the chamber.

2. An apparatus for making double glazed units comprising a welding chamber, a carriage movable in and out of the welding chamber, said carriage having an opening in a side thereof, an upper lifting means supported in the welding chamber in vertical alignment with the carriage when it is in the chamber, and a lower lifting means in vertical alignment with said upper lifting means and movable through the opening in the carriage into contact with the bottom surface of a sheet of glass mounted on the carriage to raise the glass from the carriage and being free from engagement with the carriage as it moves away therefrom.

3. An apparatus for making double glazed units comprising a welding chamber, a carriage having a glass supporting surface movable in and out of the welding chamber, an upper lifting means supported in the welding chamber in vertical alignment with said carriage when it is in said chamber, and a lower lifting means supported in the bottom of said welding chamber in alignment with said upper lifting means and movable upwardly past the glass supporting surface of said carriage into contact with the bottom surface of a sheet of glass mounted on the carriage to raise the glass from the carriage, said lower lifting means being free from engagement with said carriage as it moves away therefrom.

4. An apparatus for making double glazed units comprising a welding chamber having an opening in a side thereof, carriage means having an upper surface for supporting two sheets of glass in superposed touching relationship with the marginal edges of the sheets being aligned with each other, carriage supporting means extending from within said welding chamber through said opening therein to a point outside of said chamber to permit the movement of said carriage thereover into and out of said chamber, a lower lifting means in said welding chamber movable past the glass supporting surface of said carriage for engaging and lifting at least one of said glass sheets vertically to a position above said carriage, and an upper lifting means in said welding chamber vertically aligned with said lower lifting means for engaging and lifting the uppermost sheet of said two glass sheets vertically to a position closely adjacent but spaced from the lowermost glass sheet, said first and second lifting means being adapted to support said glass sheets in spaced opposed relationship in said welding chamber until the peripheral edges of said sheets are welded to form a double glazed unit, and said lower lifting means being free from engagement with said carriage as it moves into and away from a position aligned with said upper and lower lifting means.

5. An apparatus for making double glazed units comprising a welding chamber having an opening in a side thereof, carriage means having an upper surface for supporting two sheets of glass in superposed touching relationship with the marginal edges of the sheets being aligned with each other, carriage supporting means extending from within said welding chamber through said opening therein to a point outside of said chamber to permit the movement of said carriage thereover into and out of said chamber, lifting means in said welding chamber movable past the glass supporting surface of said carriage for engaging and lifting the two glass sheets in superposed touching relationship vertically to a position above said carriage, means in said welding chamber for engaging and lifting the uppermost sheet of said two glass sheets vertically to a position closely adjacent but spaced from the lowermost sheet, means for supporting said glass sheets in spaced opposed relation in said welding chamber until the peripheral edges of said sheets are welded to form a double glazed unit, said sheet lifting and supporting means being free from engagement with said carriage as it moves into and away from a position aligned with said lifting means.

6. A method of producing a multiple glazed unit composed of two sheets which are spaced from each other with the edges of at least one of the sheets being bent and welded to the edges of the other sheet, which comprises supporting for movement cleaned first and second glass sheets so as not to mar their surfaces, moving said supported sheets into a preheating zone, preheating them, moving them into a welding zone, transferring said first sheet to a position for welding by contacting its bottom surface only, supporting said second sheet by its top surface only and moving it thus supported to a position for welding above and slightly spaced from said first sheet, and heating the edges of the glass sheets to cause them to join together and weld to each other.

7. A method of producing a multiple glazed unit composed of two glass sheets which are spaced from each other with the edges of at least one of the sheets being bent and welded to the edges of the other sheet which comprises supporting for movement clean top and bottom glass sheets in vertical alignment with their surfaces which are to form the interior of the unit in contact with each other, moving the sheets in said supported, contacting relationship into a preheating zone, preheating the sheets while in said supported, contacting relationship, moving the preheated and supported sheets into a welding zone, moving said sheets in said contacting and aligned relationship to a welding position by contacting the bottom surface only of the bottom sheet, supporting said top sheet by its top surface, separating said sheets a slight distance, and, while holding the sheets in spaced relation, heating their edges to cause them to join together and weld to each other.

References Cited in the file of this patent

UNITED STATES PATENTS 2,624,979   Clever et al. _____ Jan. 13, 1953